United States Patent [19]

Dennis et al.

[11] 4,337,932

[45] Jul. 6, 1982

[54] SAFETY DEVICE FOR A WORKPIECE HOLDER

[75] Inventors: Ronald E. Dennis, Peoria Heights; Richard W. Kizer, Morton, both of Ill.

[73] Assignee: Caterpillar Tractor Co., Peoria, Ill.

[21] Appl. No.: 245,221

[22] PCT Filed: Jun. 25, 1980

[86] PCT No.: PCT/US80/00807

§ 371 Date: Jun. 25, 1980

§ 102(e) Date: Jun. 25, 1980

[87] PCT Pub. No.: WO82/00017

PCT Pub. Date: Jan. 7, 1982

[51] Int. Cl.³ .............................................. B23Q 3/14
[52] U.S. Cl. ..................................... 269/23; 269/48.1
[58] Field of Search ................. 254/934, 8 B; 157/18; 279/2 R, 2 A; 228/44.5; 242/72 R, 72.1; 269/47, 48.1, 50, 232, 239, 23

[56] References Cited

U.S. PATENT DOCUMENTS

| 1,447,242 | 3/1923 | Fritz | 254/93 H |
|---|---|---|---|
| 1,624,151 | 4/1927 | Shevlin | 254/93 H |
| 2,736,531 | 2/1956 | Wilson | 254/93 H |
| 3,770,032 | 11/1973 | Stull . | |
| 3,993,286 | 11/1976 | Greene et al. | 254/8 B |
| 4,169,589 | 10/1979 | Dennis | 269/98.1 |
| 4,251,056 | 2/1981 | Maniglia | 248/8 B |

Primary Examiner—Robert C. Watson
Attorney, Agent, or Firm—Wegner, Stellman, McCord, Wood & Dalton

[57] ABSTRACT

A workpiece holder (10) having a plurality of elements (38) movable radially outwardly into engagement with an inner surface of a workpiece (74) in response to movement of a cam (48) and includes at least one spring-actuated latch (56) which engages the cam (48) and prevents disengagement of the workpiece holder (10) from the workpiece (74) during operation of the workpiece holder.

13 Claims, 3 Drawing Figures

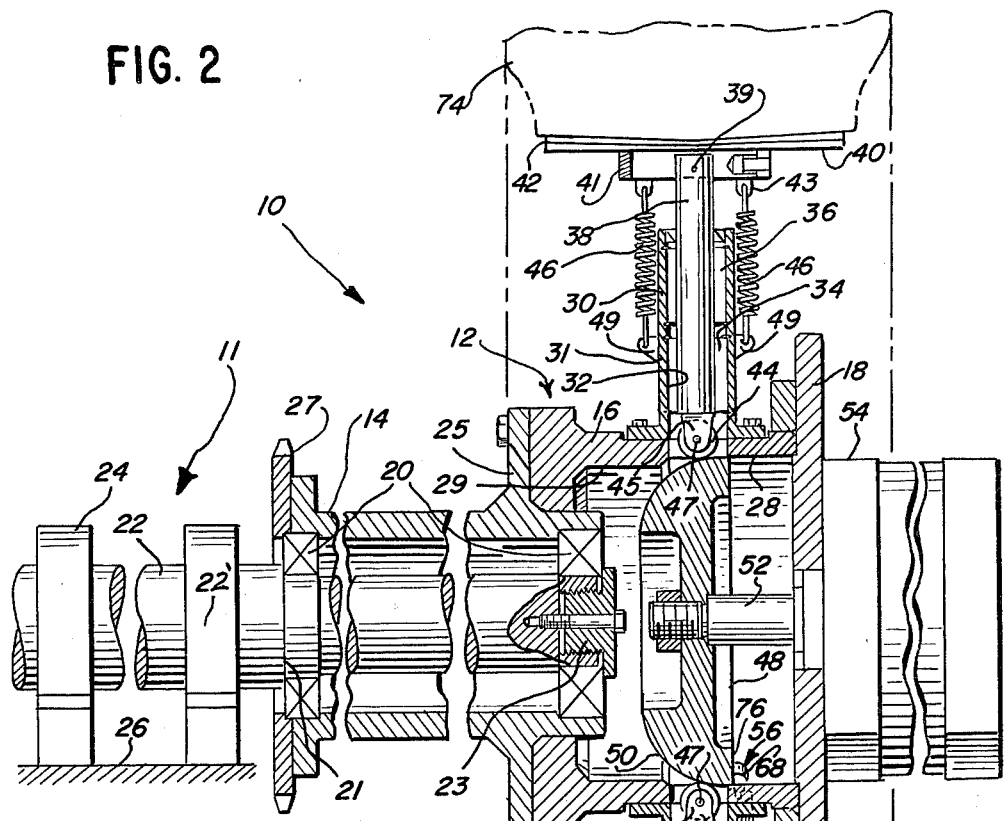
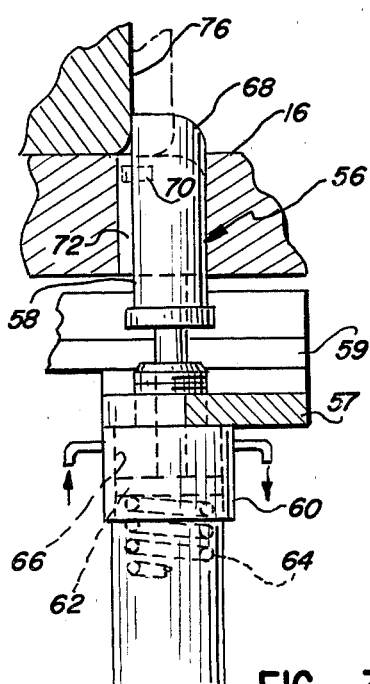
FIG. 2
FIG. 3

SAFETY DEVICE FOR A WORKPIECE HOLDER

DESCRIPTION

1. Technical Field

This invention relates to a workpiece holder and, more particularly, to a safety device for the workpiece holder to prevent a workpiece from falling from the workpiece holder.

2. Background Art

In manufacturing large tires for earthmoving vehicles, layers of tire materials, such as uncured rubber, breaker plies and belts, are applied to the exterior surface of a toroidal-shaped core as it is being rotated about its axis. The core remains within the tire carcass during construction and is eventually dissolved as one of the final steps in making the tire. Since the tire materials must be applied to both the sidewalls and the crown area of the carcass, it is desirable to support the core by gripping the inner surface.

Workpiece holders have been devised which include a plurality of slidable elements with gripping devices mounted on a support structure which extend radially relative to a longitudinal axis of the support structure. One such structure is shown in U.S. Pat. No. 4,169,585, issued Oct. 2, 1979 to Ronald E. Dennis, entitled Workpiece Holder, and assigned to the common assignee of the present invention. In the patented structure, a cam engages the inner ends of the slidable elements and is movable along the longitudinal axis between a first position at which the elements are retracted away from the workpiece and a second position wherein the cam engages the inner surface of the elements to cause outward extension and engagement of the gripping devices with the inner surface of the annular core workpiece. In the existing workpiece holders, the cam is actuated by a shaft which extends along the longitudinal axis of the support structure. Since the extendible elements and support structure must rotate, this results in a relatively complex structure. It is therefore desirable to simplify construction of the workpiece holder by eliminating the longitudinal cam-actuating shaft.

In addition, since the cores can be very large in diameter (100 inches, for example) and are rotated during manufacture, means must be provided which will ensure that engagement between the workpiece holder and the core is maintained during operation. Loss of gripping force and detachment of the core from the holder can result in equipment damage or injury to the operator. Heretofore, continued engagement has depended upon the integrity of springs or fluid pressure which actuates the cam. It is, therefore, desirable to provide a safety device which will maintain the cam in its extended-holding position should actuating power to the cam be lost.

The present invention is directed to overcoming one or more of the problems as set forth above.

DISCLOSURE OF INVENTION

In one aspect of the present invention, the problems noted above are overcome by providing a rotating workpiece holder which is mounted on a solid cantilever shaft. The support structure includes a number of engagement arms which are mounted on the support structure perpendicular to the mounting shaft and which extend radially outward to contact the core. The support arms are extended into engagement with the core by a central cam mounted on the output shaft of a fluid cylinder attached to the support structure opposite the cantilever mounting shaft.

In addition, to maintain the central cam in its operative position, the support structure is provided with a spring-operated latch which engages the rear surface of the cam and prevents relative motion between the cam and the support structure.

BRIEF DESCRIPTION OF DRAWINGS

FIG. 2 is a sectional elevational view of the workpiece holder taken generally along line 2—2 of FIG. 1; and FIG. 3 is an enlarged partial sectional view of the safety latch device taken along line 3—3 of FIG. 1 illustrating the safety latch rod and its spring actuated fluid return cylinder.

BEST MODE FOR CARRYING OUT THE INVENTION

Figure 1:
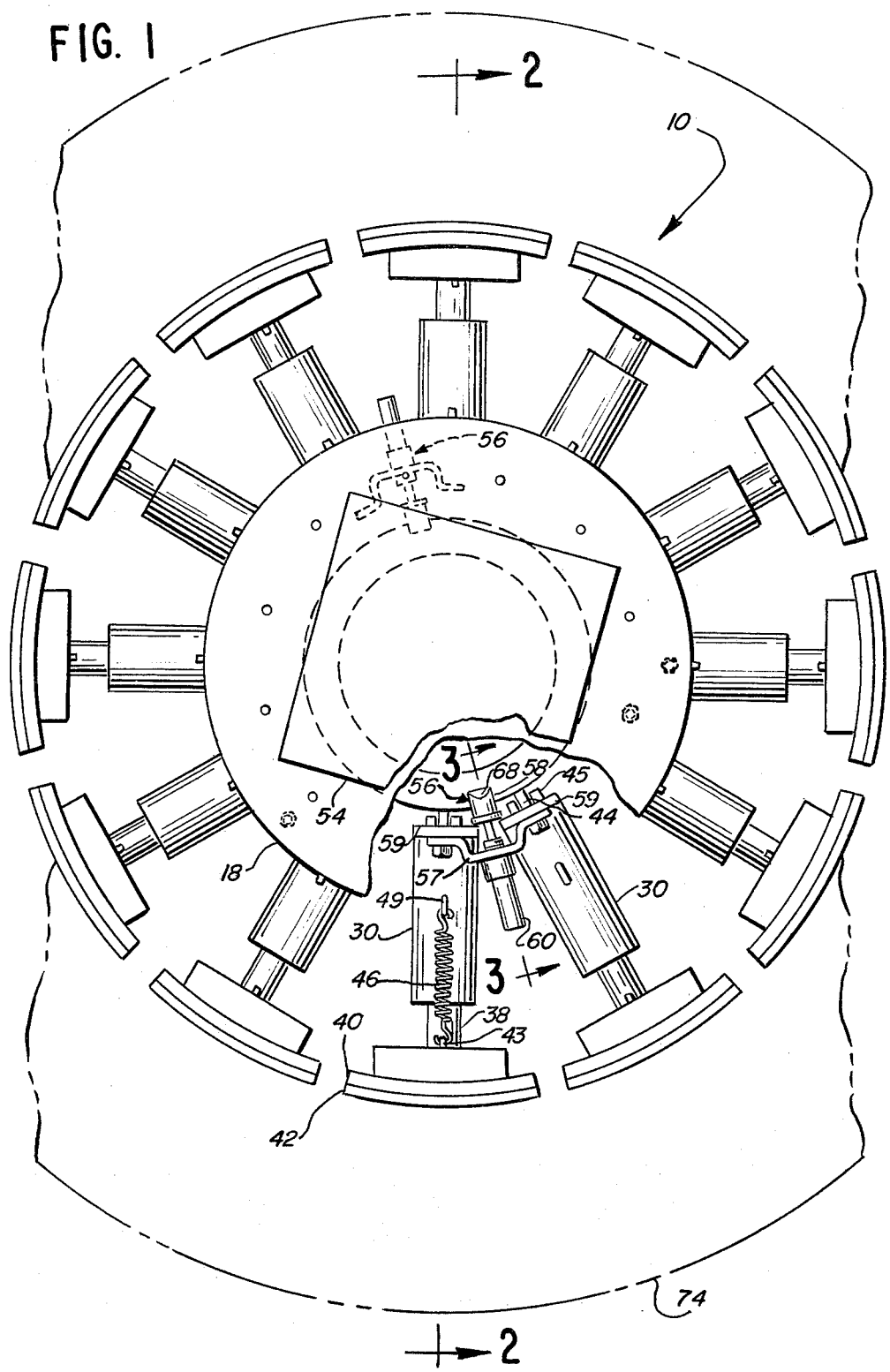
FIG. 1 is an end elevational view of the workpiece holder of the present invention illustrating the radial support arms and the safety latch device.

Referring now to the drawings, a workpiece holder, generally indicated 10, includes a mounting frame 11 and a support structure 12 having a spindle 14, a hub 16 and an end plate 18. The spindle 14 is hollow and is journaled on spaced apart bearings 20 mounted on a solid shaft 22 of the mounting frame 11. One bearing 20 bears against a shoulder 21 on the shaft 22 with the other bearing 20 being held on the end portion of the shaft 22 by a retainer 23. The shaft 22 has a longitudinal axis 22' and remains fixed during operation. The shaft 22 is supported in cantilever fashion by clamps 24 attached to a support base 26.

The spindle 14 is rotated on the shaft 22 by means of a sprocket 27 suitably connected to a source of power, such as an electric motor (not shown), which may be mounted on the support base 26.

The spindle 14 has a flange 25 which is bolted to the hub 16 which, in turn, is secured to the end plate 18. The hub 16 has a cylindrical wall 29 defining a bore 28 concentric with the mounting shaft 22. A plurality of radially oriented spokes 30 are connected to the hub 16 and extend radially outwardly therefrom. Each of the spokes 30 has an outer sleeve 31 with a bore 32 opening into the bore 28 located in the hub 16.

Each sleeve 31 of the spokes 30 has a central guide bearing 34 and an end guide bearing 36 secured in the bore 32 of the sleeve 31 to maintain a rod 38 in concentric alignment with said sleeve 31 of the spoke 30. Each of the rods 38 has an arcuate shoe 40 connected by a pin 39 to the outer distal end portion with each shoe 40 having a resilient pad 42 on the outer surface. A continuous wall 41 is secured to the radial inner surface of the shoe 40 about the connection with the rod 38 and has a pair of longitudinally spaced tabs 43 thereon connected by dual extension springs 46 to tabs 49 on the sleeves 31 of the spokes. The dual extension springs 46 being connected to the shoes 40 and to the spokes 30 resiliently retract the rods 38 from an extended position, shown in the drawings, towards the longitudinal axis 23 of the shaft 22, spindle 14 and hub 16. Each of the rods 38 has a pair of rollers 44 rotatably connected by a pin 47 to a projection 45 on the inner proximal end portion of the rod.

A circular cam 48 is slidably positioned within the bore 28 in the hub 16 and has a cam surface 50 which may be moved into engagement with the rollers 44 at the inner end portion of the rods 38. The cam surface 50 is a surface of revolution in which a constant arc radius is revolved about the longitudinal axis 23 of the shaft 22. The cam 48 is movable within the bore 28 between a first position where the cam 48 is adjacent the hub end plate 18 and an extended position shown in FIG. 2 wherein the cam surface 50 engages the rollers 44 to move the radial rods 38 radially outwardly. Movement of the cam 48 is produced by an output shaft 52 of a fluid cylinder 54 attached to the hub end plate 18.

As illustrated in FIGS. 1 and 3, a safety latch mechanism, generally indicated 56, is attached by a yoke 57 to flanges 59 on two adjacent spokes 30 and rotates with the hub 16. The latch mechanism 56 includes a locking rod 58 which extends through the hub 16 and which may be extended or retracted by means of a spring-actuated, fluid-return cylinder 60. The extended position of the locking rod 58 is illustrated in FIG. 3 by solid lines and the retracted position by broken lines.

The spring-actuated, fluid-return cylinder 60 operates to bias the locking rod 58 to the extended position within the hub bore 28 by means of a constant force applied to the cylinder piston 62 by a compression spring 64 internal of the fluid-return cylinder 60. The piston 62, and the attached locking rod 58, may be withdrawn by applying pressurized fluid to a chamber 66 located in the cylinder 60 above the piston 62.

Since the locking rod 58 is biased toward its extended position, the end extending into the bore 28 is provided with an inclined surface 68 which interacts with the advancing cam surface 50 to move the rod 58 toward its retracted position compressing the springs 64. To ensure that the inclined surface 68 of the locking rod 58 is always presented to the cam surface 50, a pin 70 is provided protruding from one face of the locking rod. This pin extends into a guide slot 72 formed in the hub 16.

INDUSTRIAL APPLICABILITY

In operation, the cam 48 is initially located adjacent the end plate 18 which allows the dual spoke springs 46 to retract the rods 38 by forcing the rollers 44 into the hub bore 28. A toroidal body, such as a core, 74 may then be maneuvered into position in line with the spoke shoes 40. Pressurized fluid is then applied to the cylinder 54 causing the piston shaft 52 and cam 48 to move toward the shaft 22 and rollers 44. Continued movement of the cam 48 causes the rollers 44 to follow the cam surface 50 thereby extending all the rods 38 simultaneously so that the shoes 40 engage the inner surface of the core 74 and center the core relative to the longitudinal axis 23 of the mounting shaft 22.

While the cam 48 is moving from its position adjacent the end plate 18 into contact with the rollers 44, it must pass over the locking rod 58. During the cam movement, the latch cylinder 60 is not pressurized which allows the cylinder spring 64 to force the rod 58 toward and into the hub bore 28. Interaction between the cam surface 50 and the inclined surface 68 of the locking rod 58 causes the rod 58 to be forced toward its retracted position thereby compressing the cylinder spring 64. When the rear surface 76 of the cam 48 passes beyond the locking rod 58, the spring 64 is once again able to force the rod 58 into the hub bore 28. Extension of the spring 64 causes the locking rod 58 to be interposed between the rear surface 76 of the cam 48 and the plate 18 of the hub 16 thereby preventing the cam 48 from moving out of engagement with the rollers 44. When the core 74 is thus clamped into position, the motor connected to the drive sprocket 27 is activated causing the spindle 14, hub 16, end plate 18 and cam-actuating cylinder 54 to rotate.

When operations on the carcass and core 74 are completed, pressurized fluid is introduced into the cylinder chamber 66 thus counteracting the biasing force of spring 64 and retracting the locking rod 58. The cam 48 may then be withdrawn, either by means of a spring within the cylinder 54 or by applying pressurized fluid to the opposite surface of the piston within the cylinder 54. Movement of the cam 48 to its retracted position adjacent the end plate 18 allows the rollers 44 and rods 38 to move into the bore 28 in response to forces created by the dual spoke springs 46. When the cam 48 has been retracted, fluid pressure within the latch cylinder chamber 66 is relieved thus permitting the spring 64 to extend the locking rod 58 into the bore 28 forward of the cam 48. The cam 48 and locking rod 58 are thus in position to begin another operation.

In view of the foregoing, it is readily apparent that the structure of the present invention provides a workpiece holder which is simpler in construction than those presently in existence and also one which substantially decreases the possibility of accidental disengagement with the workpiece. The construction is simplified because the entire rotating structure, which includes the spindle 14, the hub 16, the end plate 18, the spokes 30 and the cam-actuating cylinder 54 is simply supported in cantilever fashion by a single solid mounting shaft 22. Inclusion of the safety latch mechanism 56 prevents the cam 48 from retracting and disengaging the gripping structure 10 from the workpiece even in the event of interruption of actuating power to the cylinder 54.

While the latch rod 58 has been illustrated extending into the bore 28 adjacent the rear surface 76 of the cam 48, it would be equally possible and effective to have the rod 58 engage a recess (not shown) in the cam intermediate the cam surface 50 and the rear surface 76.

Although the workpiece holder of the present invention has been described with respect to a core 74 having a circular inner surface, the structure may be adapted to workpieces having various different inner surface configurations. For example, square workpieces may be accommodated by providing two sets of diametrically opposed spokes 30 having flat gripping shoes 40 at the end of the spoke rods 38. Further, workpieces having rectangular or elliptical inner surfaces may be accommodated by providing spokes 30 with rods 38 of different lengths.

Finally, while the safety latch mechanism 56 has been described in terms of a single structure, it also should be readily apparent that more than one locking rod 58 and cylinder 60 may be provided around the circumference of the hub 16. As an example, FIG. 1 illustrates that two latch mechanisms 56 may be provided opposite one another.

Other aspects, objects, and advantages of this invention may be obtained from a study of the drawings, disclosure and the appended claims.

We claim:
1. In a workpiece holder (10) for supporting the inner surface of a workpiece (74) including:
   a support structure (12) having a central bore (28);
   spokes (30) carried by said support structure (12),
   means (38) for engaging said workpiece and for projecting into said bore, said means being slidably attached to said spokes (30) and extending perpen- dicular to the longitudinal axis (23) of said bore (28), said means (38) having distal ends (40) engaging said workpiece and proximal ends (44) projectable into said bore (28);

a cam (48) located within said bore (28) having a sloped cam surface (50) engaging said proximal ends (44) and movable between a first position at which said proximal ends project into said bore (28) thereby retracting said means (38) on said spokes (30) and a second position wherein said cam surface (50) moves said proximal ends (44) outwardly thereby extending said means (38) on said spokes (30) into engagement with said workpiece (10), the improvement comprising:

latch means (56) for preventing said cam (48) from moving from said second position toward said first position, said latch means (56) includes means (64) for moving said latch means (56) from an inoperative position to an operative position in engagement with said cam (48) for holding said cam (48) in said second position.

2. In a workpiece holder (10) for supporting the inner surface of a workpiece (74) including:

a support structure (12) having a central bore (28);
spokes (30) carried by said support structure (12);
means (38) for engaging said workpiece and for projecting into said bore, said means being slidably attached to said spokes (30) and extending perpendicular to the longitudinal axis (23) of said bore (28), said means (38) having distal ends (40) engaging said workpiece and proximal ends (44) projectable into said bore (28);

a cam (48) located within said bore (28) having a sloped cam surface (50) engaging said proximal ends (44) and movable between a first position at which said proximal ends project into said bore (28) thereby retracting said means (38) on said spokes (30) and a second position wherein said cam surface (50) moves said proximal ends (44) outwardly thereby extending said means (38) on said spokes (30) into engagement with said workpiece (10), the improvement comprising:

latch means (56) for preventing said cam (48) from moving from said second position toward said first position, said latch means (56) includes a projection (58) carried by said support structure (12) which is selectively extendible into engagement with said cam (48).

3. In a workpiece holder (10) for supporting the inner surface of a workpiece (74) including:

a support structure (12) having a central bore (28);
spokes (30) carried by said support structure (12);
means (38) for engaging said workpiece and for projecting into said bore, said means being slidably attached to said spokes (30) and extending perpendicular to the longitudinal axis (23) of said bore (28), said means (38) having distal ends (40) engaging said workpiece and proximal ends (44) projectable into said bore (28);

a cam (48) located within said bore (28) having a sloped cam surface (50) engaging said proximal ends (44) and movable between a first position at which said proximal ends project into said bore (28) thereby retracting said means (38) on said spokes (30) and a second position wherein said cam surface (50) moves said proximal ends (44) outwardly thereby extending said means (38) on said spokes (30) into engagement with said workpiece (10), the improvement comprising:

latch means (56) for preventing said cam (48) from moving from said second position toward said first position;

said cam (48) includes a substantially flat surface (76) opposite said cam surface (50) and said latch means may be extended into said bore (28) from said support structure (12) adjacent said flat surface (76).

4. In a workpiece holder (10) for supporting the inner surface of a workpiece (74) including:

a support structure (12) having a central bore (28);
spokes (30) carried by said support structure (12);
means (38) for engaging said workpiece and for projecting into said bore, said means being slidably attached to said spokes (30) and extending perpendicular to the longitudinal axis (23) of said bore (28), said means (38) having distal ends (40) engaging said workpiece and proximal ends (44) projectable into said bore (28);

a cam (48) located within said bore (28) having a sloped cam surface (50) engaging said proximal ends (44) and movable between a first position at which said proximal ends project into said bore (28) thereby retracting said means (38) on said spokes (30) and a second position wherein said cam surface (50) moves said proximal ends (44) outwardly thereby extending said means (38) on said spokes (30) into engagement with said workpiece (10), the improvement comprising:

latch means (56) for preventing said cam (48) from moving from said second position toward said first position, said latch means (56) includes a rod (58) extending from said support structure (12) and means (64) for biasing said rod into engagement with said cam (48).

5. The workpiece holder (10) of claim 4 including means (60) for withdrawing said rod (58) from engagement with said cam (48).

6. The workpiece holder (10) of claim 2 wherein said latch means (56) includes a cylinder (60) attached to said support structure (12) and to said rod (58), said cylinder (60) moving said rod (58) from engagement with said cam (48), and spring biasing means (64) for moving said rod (58) into engagement with said cam (48).

7. The workpiece holder (10) of claim 6 wherein said rod (58) includes an inclined surface (68) positioned to interact with said cam surface (50) on said cam (48), said movement of said cam (48) from said first to said second position will move said rod (58) toward said support structure (12) against said biasing spring (64).

8. A workpiece holder (10) for supporting the inner surface of a workpiece (74) including:

a hollow cylindrical hub (16) having a cylindrical wall (29) and a longitudinal central bore (28); spokes (30) carried by said hub (16) and having a first means (38) slidably attached to said spokes (30) and extending radially through said wall (29);

a cam (48) having a cam surface (50) and a flat rear surface (76) and being movable between a first position at which said first means (38) project into said bore and a second position at which said sloping face (50) moves said first means (38) radially outwardly, the improvement comprising:

a latch means (56) for releasably locking said cam (48) in said second position including a rod (58) extending through said wall (29) into said bore (28) and into intimate contact with said rear surface (76).

9. The workpiece holder (10) of claim 8 having a fluid cylinder (60), a piston (62) in said cylinder (60) operatively connected to said rod (58), and means (64) for urging said piston (62) and said rod (58) toward said bore (28).

10. The workpiece holder (10) of claim 9 wherein said last-named means (64) is a spring (64) bearing on said piston for urging said rod toward said bore (28).

11. The workpiece holder (10) of claim 10 wherein said rod (58) is withdrawn from said bore (28) by applying fluid pressure to said piston (62) in the cylinder (60) on the opposite side of said piston (62) from said spring (64).

12. The workpiece holder (10) of claim 8 wherein said rod (58) includes an inclined surface (68) facing said cam surface (50) on said cam (48), when said cam (48) is in said first position.

13. The workpiece holder (10) of claim 8 wherein said rod (58) includes an inclined surface (68) facing said cam surface (50) of said cam (48) when said cam (48) is in said first position, said inclined surface (68) interacting with said cam surface (50) to move said rod (58) against said spring (64) away from said bore (28) to permit passage of said cam (48) to said second position.

* * * * *